(12) United States Patent
Shin

(10) Patent No.: US 9,881,030 B2
(45) Date of Patent: Jan. 30, 2018

(54) DISTRIBUTED ARCHIVE SYSTEM, DATA ARCHIVE DEVICE, AND DATA RESTORING DEVICE WITH IMPROVED RESTORATION AND SECURITY

(75) Inventor: Yoshihiro Shin, Hyogo (JP)

(73) Assignees: Digital Media Research Institute, Inc., Kanagawa (JP); GLOBIT Co., Ltd., Kanagawa (JP)

(*) Notice: Subject to any disclaimer, the term of this patent is extended or adjusted under 35 U.S.C. 154(b) by 1091 days.

(21) Appl. No.: 13/882,033

(22) PCT Filed: Nov. 7, 2011

(86) PCT No.: PCT/JP2011/075534
§ 371 (c)(1),
(2), (4) Date: Jun. 22, 2013

(87) PCT Pub. No.: WO2012/063755
PCT Pub. Date: May 18, 2012

(65) Prior Publication Data
US 2013/0275386 A1    Oct. 17, 2013

(30) Foreign Application Priority Data
Nov. 8, 2010   (JP) .................................. 2010-249917

(51) Int. Cl.
*G06F 7/00* (2006.01)
*G06F 17/30* (2006.01)
(Continued)

(52) U.S. Cl.
CPC .... *G06F 17/30289* (2013.01); *G06F 11/1076* (2013.01); *G06F 11/1458* (2013.01);
(Continued)

(58) Field of Classification Search
CPC ........... G06F 17/30094; G06F 11/1458; G06F 21/602; H04L 9/0816
See application file for complete search history.

(56) References Cited

U.S. PATENT DOCUMENTS 8,677,081 B1*  3/2014  Wentzlaff ............ G06F 12/0811
                                                        711/130
2002/0138504 A1*  9/2002  Yano .................... G06F 11/1464
(Continued)

FOREIGN PATENT DOCUMENTS

JP     2006-113663     4/2006
JP     2006113663      4/2006
JP     2006228202      8/2006

*Primary Examiner* — Charles Lu
(74) *Attorney, Agent, or Firm* — Notaro, Michalos & Zaccaria P.C.

(57) ABSTRACT

A system for a distributed archive and data restoration which achieves both high-speed processing and security is provided. A random number is generated by a seed random number generator, and inputted to a key random number generator as a seed, and each data fragment is obtained by dividing a source data file to be archived, and is redundantly stored on (n−k+1) storage mediums identified as destination storage mediums among n storage mediums on the basis of the random number generated by the key random number generator each time where n is an integer no less than 2 and k is an integer no more than value of n.

5 Claims, 14 Drawing Sheets

Archive Operation of Correlation Unit ( on Smart Card)

(51) Int. Cl.
*H04L 9/08* (2006.01)
*G06F 21/60* (2013.01)
*G06F 11/14* (2006.01)
*G06F 21/62* (2013.01)
*G06F 21/77* (2013.01)
*G06F 11/10* (2006.01)

(52) U.S. Cl.
CPC ...... *G06F 17/30094* (2013.01); *G06F 21/602* (2013.01); *G06F 21/6209* (2013.01); *G06F 21/77* (2013.01); *H04L 9/085* (2013.01); *H04L 9/0816* (2013.01); *H04L 9/0869* (2013.01); *G06F 2211/1028* (2013.01); *G06F 2221/2153* (2013.01)

(56) References Cited

U.S. PATENT DOCUMENTS

2008/0137857 A1* 6/2008 Bellare ............... H04L 9/085
                                                    380/255
2008/0155114 A1* 6/2008 Mungavan ........ G06F 17/30867
                                                    709/231
2009/0161870 A1* 6/2009 Rosenberg .......... G06F 21/6218
                                                    380/268
2010/0064166 A1* 3/2010 Dubnicki .......... G06F 17/30067
                                                    714/4.1

* cited by examiner

Theoretical Illustration of Present Invention

Simulation Result of Present Invention

Simulation Result of Present Invention

| ID | 4:2 Division key | Identified Storage Mediums |
|----|------------------|----------------------------|
| 1  | d_keys1          | {dst_file1, dst_file2, dst_file3} |
| 2  | d_keys2          | {dst_file1, dst_file2, dst_file4} |
| 3  | d_keys3          | {dst_file1, dst_file3, dst_file4} |
| 4  | d_keys4          | {dst_file2, dst_file3, dst_file4} |

Illustration of Division Keys

| n | 3 | 4 | 4 | 5 | 5 | 5 | 6 | 6 | 6 | 6 |
|---|---|---|---|---|---|---|---|---|---|---|
| k | 2 | 2 | 3 | 2 | 3 | 4 | 2 | 3 | 4 | 5 |
| Number of n:k division key | 3 | 4 | 6 | 5 | 10 | 10 | 6 | 15 | 20 | 15 |

Number of Division Keys

Whole Configuration of First Embodiment

Example of Correlation Unit

Example of Correlation Unit

Archive Operation of Correlation Unit ( on Smart Card)

Restoration Operation of Correlation Unit (on Smart Card)

Operation on Smart Card of Second Embodiment (Archive)

Operation on Smart Card of Third Embodiment (Archive)

DISTRIBUTED ARCHIVE SYSTEM, DATA ARCHIVE DEVICE, AND DATA RESTORING DEVICE WITH IMPROVED RESTORATION AND SECURITY

TECHNICAL FIELD

The present invention relates to distributed archive technologies.

BACKGROUND

For distributed archive systems, in light of the availability and security of data, the technology of RAID (Redundant Array Of Inexpensive Disks) has been used in order to protect data from failure of a disk especially. For example, in RAID1 systems, the completely same contents are recorded on two independent disks (mirroring) and when one disk breaks down, data can be picked out from another disk. On the other hand, in RAID3 systems, data is distributed and recorded on n disks, and one of disks is dedicated for recording parities. When one disk breaks down among n disks, the parities can restore the original data from the n−1 remaining disks.

However, in carrying out distributed record of data at archive servers on the Internet, such as cloud computing., due to failure on the Internet, failure of a server, a denial of service attack, etc., a situation when two or more servers cannot be simultaneously accessed may occur, and accordingly RAID systems cannot resolve the data availability and consistency problems, which can cope with the access problem over only one server.

Since the RAID systems in themselves include no data security mechanism for guaranteeing the security of the data archived, it is necessary to use them together with an additional encryption technology, and it becomes as an overhead on an equipment configuration and performance.

Japanese Patent No. 360770 describes an invention in which the secret sharing scheme introduced by SHAMIA (Adi Shamir, How To Share A Secret, Communications Of ACM, 22 (11), 612-613 pages, 1979.) is employed to enable to restore data if k ones among n servers can be accessed, with flexibilities for applying to Internet environment, and to guarantee theoretically that the original data shall not be restored even if date is leaked from (k−1) servers.

However, in the secret sharing scheme of SHAMIA, modular exponentiation calculation having much computational cost is required for each data segments formed by dividing data. Due to that computational cost in addition to restricted capabilities of computers, the length of a data segment is at most thousands of bits, and accordingly that invention is not practical for purpose of archiving large data of more than several megabytes and several gigabytes in view of calculation efficiency.

It is possible to repeatedly archive data segments with redundancy according to a determined secret pattern, but it would be difficult to prove the security. Indeed, the same pattern will occur repeatedly, and it is easily assumed that at least a part of the data will be restored by pattern analysis. As long as the security cannot be proved, it is necessary to use encryption technology additionally, and an overhead on an equipment configuration and performance is raised in the same way as mentioned above.

CITATION LIST

Patent Literature

Patent Literature 1: Japanese Patent No. 360770

Non-Patent Literature

Non-patent Literature 1: Adi Shamir, How To Share A Secret, Communications Of ACM, 22 (11), 612-613 pages, 1979

SUMMARY OF THE INVENTION

Problem to be Solved by the Invention

In view of the problem of the prior art described in the background of the invention, the present invention is directed to a technique in which, for arbitrarily selected k and n ($0 \leq k \leq n$), data is distributed and recorded on n servers or storing mediums, satisfying two requisites about availability and security mentioned below, enabling to process the high speed data archive and restoration, and theoretically confirming the security.

Requirement one: If data is obtained from k servers or storage mediums among n ones, the original data can be restored completely. This requirement is referred to as n:k threshold availability.

Requirement tow: Even if an attacker can obtain data without authorization from k−1 servers or storage mediums among n ones, the original data cannot be restored from the obtained data. This requirement is referred to as n:k threshold security.

In the field of information security in particular encryption technology, it is not allowed to assert that a scheme is safe only with the fact that no effective attack method for the scheme is discovered, but it is indeed allowed to assert the safety of the scheme by proving based on a mathematical theory that no attack against the scheme is operable (actually, the probability of offensive success is very low). In this regard, an important problem to be solved by the present invention is to achieve a technology satisfying the both of two requirements, as well as satisfying both of efficient processing and proof of security.

The present invention should not be restrictively understood by the above-mentioned problem, and the contents thereof shall be defined by attached Claims, which is described below with reference to embodiments thereof.

Means for Solving Problems

According to the first aspect of the present invention, pointing means points a data head in an initial state and moves unidirectionally toward a data end along with advance of processing; for each routine, a data fragment having a certain length is taken out from the pointed position, and (n−k+1) storage mediums for storing that data fragment are selected independently and randomly among n storage mediums, and then the data fragment is redundantly stored in the selected storage mediums, and then the pointer position proceeds by the length of the data fragment; and the routine is repeated until the pointer position reaches the data end.

In this configuration, since each data fragment is redundantly recorded on the (n−k+1) storage mediums, when k storage mediums are chosen arbitrarily, at least one storage medium unit records the data fragment concerned. Thereby, the n:k threshold availability is guaranteed.

On the other hand, a probability that the data fragment concerned is included in any one of (k−1) storage mediums when the (k−1) storage mediums are selected arbitrarily is given as, $$1 - 1/{}_nC_{(k-1)}$$

and, accordingly, the data of $1 - 1/{}_nC_{(k-1)}$ will be lost on an average to the whole data, and the n:k threshold security is guaranteed.

The security of data according to the first aspect of the present invention is analyzed in detail as follows, and stronger security is guaranteed. Indeed, the ratio of data fragments obtained without authorization from the storage medium units to the whole archived data is not important. Rather, unless positions at which data fragments included in the archived data appear in the original data can be expected, the original data cannot be restored. The following considerations are made in order to evaluate a probability that an attacker can succeed in that expectation.

Let N be the total number of final data fragments obtained by dividing the data, and let m be the number of the data fragments contained in a particular storage medium. Since the archive destinations of each data fragment are determined independently and randomly, the expected value of m is given by the following formula:

$$m \approx N \times (n-k+1)/n$$

Let a probability that the j-th data fragment in the archived data is a copy of the a-th data fragment in the original data to be expressed in the following formula:

$$\text{Succ}(a,j;N,m)$$

where a is the order of the data fragment from the data head in the original data, and j is the order of the data fragment from the head in the archived data stored in the storage medium. The probability is evaluated by the following formula:

$$\text{Succ}(a,j;N,m) = {}_{(a-1)}C_{(j-1)} \times {}_{(N-a)}C_{(m-j)}/{}_NC_m$$

For a given a, Succ (a, j; N, m) takes the maximum value at the time of j=[am/(N+1)]. Here, [x] is an integer obtained by truncating below the decimal point of x. Therefore, Succ(a,[am/(N+1)];N,m) is the maximum of a success probability with the expectation that the position in the original data of the j-th data fragment in the archived data from the head has the a-th order position in the original data.

Succ (a, [am/(N+1)];N,m) is approximated using Stirling's formula as follows:

$$\text{Succ}(a,[am/(N+1)];N,m) \approx (1/\pi^{1/2} \times (m/N) \times [(N-1)/(a-1)(N-a)])^{1/4}$$

FIG. 1 illustrates this approximation in a graph. When "a" is close to 1 or N, that is, the data fragments is close to the head or end of the original data, the success probability with the attacker's expectation of j=[am/(N+1)] is near to 1, while the success probability decreases quickly when the data fragment gets far from the head or the end. That is, although the attacker can expect the position in the archived data for each of a small number of data fragments placed close to the head or end of the data at a high probability, the attacker can expect at only low probability for a large number of other data fragments. FIG. 2 is a graph illustrating the result of simulation with N=100 and m=75, and FIG. 3 is a graph illustrating the result of simulation with N=1000 and m=750. Both graphs illustrate that the approximate expression theoretically introduced is suitable. In addition, to be important, when the data is divided into a very small number of fragments, with N=1000, the expectation success probability is still suppressed to about 5%. For example, when a file of 1 megabyte is divided into one byte length data fragments and archived, then N=1000000, and the expectation success probability will become very small.

Furthermore, unless positions of a considerable number of data fragments are successfully expected, it cannot be asserted that data is restored even partially. Therefore, positions of a plurality of data fragments should be successfully expected, and the expectation success probability for all the data fragments decreases quickly as the number of data fragments increases.

According to the second aspect of the present invention, which is related to the first aspect of the present invention, at each pointer position, the length of a data fragment to betaken out is determined independently and randomly, and then it will make the expectation by an attacker more difficult.

According to the third aspect of the present invention, which is related to the first aspect of the invention, at each pointer position, it is determined independently and randomly whether a data fragment should be recorded on the (n−k+1) storage mediums to advance the pointer position, or dummy data should be stored on them in place of the data fragment to keep the pointer position unchanged, and then it will make the expectation by an attacker more difficult.

According to the fourth aspect of the present invention, which is related to the second aspect of the present invention, it is determined independently and randomly whether a data fragment should be recorded on the (n−k+1) storage mediums to advance the pointer position, or dummy data should be stored on them in place of the data fragment to keep the pointer position unchanged, and then it will make the expectation by an attacker more difficult.

According to the fifth aspect of the present invention, which is related to the first aspect of the present invention, a first random number generating means is provided for generating a random number to determine each factor at random. The first random number generating means generates, at each pointer position, a random number depending on which destination storage mediums are determined using a certain procedure.

According to the sixth aspect of the present invention, which is related to the fourth aspect of the present invention, the first random number generating means is provided for generating a random number to determine each factor at random. The first random number generating means generates, at each pointer position, a random number depending on which the length of data fragment, and/or, presence or absence of dummy data in addition to destination storage mediums are determined.

According to the seventh aspect of the present invention, which is related to the sixth aspect of the present invention, a key-storage means is provided for storing a series of random numbers generated from the first random number generating means. The length of data fragment, and/or, presence or absence of dummy data, in addition to destination storage mediums, is determined depending on the series of random numbers, and the data is restored based on the random numbers.

According to the eighth aspect of the present invention, which is related to the fifth aspect or sixth aspect of the present invention, a second random number generating means is provided for generating a random number at the beginning of archive and supplying it as a seed to the first random number generating means. The first random number generating means is implemented with a pseudo-random number generation algorithm and, after receiving the seed, generates random numbers, depending on which distributed archive is performed.

According to the ninth aspect of the present invention, which is related to the eighth aspect of the present invention, a key storage means is provided for storing the seed generated by the second random number generating means. The seed stored in the key storage means is provided to the first random number generating means, and then, based on the series of random numbers generated from the first random number generating means, storage mediums from which data fragments should be obtained are determined and then the data is restored.

According to the tenth aspect of the present invention, which is related to any of the first to ninth aspects of the present invention, any or all of the storage mediums for storing the data fragments are severs which can be accessed through a network. This aims archive services on Internet.

According to the 11th aspect of the present invention, which is related to the seventh or the ninth aspect of the present invention, the key storage means is provided in a device which a user as a data owner can carry. The user can archive and restore data using any host computer with convenience enhanced.

According to the 12th aspect of the present invention, which is related to the 11th aspect of the present invention, the device which the user can carry is an IC card, a cellular phone, or PDA (Personal Digital Assistant).

According to the 13th aspect of the present invention, which is related to the 11th aspect of the present invention, the device which the user can carry is equipped with a microcomputer which controls the access to the data in the device and performs a part or all of the archive and restoring process.

According to the 14th aspect of the present invention, which is related to the 13th aspect of the present invention, the device which the user can carry has either the first random number generating means or the second random number generating means or both of them.

According to the 15th aspect of the present invention, which is related to the 14th aspect of the present invention, the microcomputer and the random number generating units provided in the device which the user can carry implemented within a tamper resistant IC chip or a so-called smart chip.

According to the 16th aspect of the present invention, which is related to any of the first to the 15th aspects of the present invention, using the above-mentioned property, dummy data unit having a small size is added to the head and tail of the original data so that the original data is included in the area where an attacker cannot expect the data and data security is enhanced.

According to the 17th aspect of the present invention, a data archive apparatus for archiving archive target data on n (n is an integer no less than 2) archive destination storage means, comprises: segmentation means for segmenting the archive target data into a plurality of data fragments using a predetermined procedure such that the data fragments cover at least all parts of the archive target data; and, correlating means for correlating each of the plurality of data fragments segmented by the segmentation means to (n−k+1) archive destination storage means independently and randomly among n archive destination storage means; wherein each of the plurality of data fragments segmented by the segmentation means is archived redundantly in the (n−k+1) archive destination storage means correlated to the each of the plurality of data fragments.

According to the 18th aspect of the present invention, a data archive computer program for archiving archive target data on n (n is an integer no less than 2) archive destination storage means, makes a computer function as segmentation means for segmenting the archive target data into a plurality of data fragments using a predetermined procedure such that the data fragments cover at least all parts of the archive target data; and, correlating means for correlating each of the plurality of data fragments segmented by the segmentation means to (n−k+1) archive destination storage means independently and randomly among the n archive destination storage means; wherein each of the plurality of data fragments segmented by the segmentation means is archived redundantly in the (n−k+1) archive destination storage means correlated to the each of the plurality of data fragments.

According to the 19th aspect of the present invention, a restoration apparatus for restoring data archived in n (n is an integer no less than 2) archive destination storage means by the archive apparatus of the 17th aspect of the present invention, comprises: correlating information obtaining means for obtaining correlating information which is used by the correlating means to correlate each of the data fragments in the data to (n−k+1) the archive destination storage means independently and randomly; data fragment obtaining means for taking out each of the data fragments from either of the (n−k+1) archive destination storage means correlated to the each of the data fragments by the correlating information; and concatenation means for concatenating the data fragments as taken out by a concatenation procedure corresponding to the predetermined procedure for the correlation.

According to the 20th aspect of the present invention, a data restoration computer program for restoring data archived in n (n is an integer no less than 2) archive destination storage means by the archive apparatus of the 17th aspect of the present invention, makes a computer function as correlating information obtaining means for obtaining correlating information which is used by the correlating means to correlate each of the data fragments in the data to (n−k+1) archive destination storage means independently and randomly; data fragment obtaining means for taking out each of the data fragments from any of the (n−k+1) archive destination storage means correlated to the each of the data fragments by the correlating information; and concatenation means for concatenating the data fragments as taken out by a connection procedure corresponding to the predetermined procedure for the correlation.

According to the 21st aspect of the present invention, a data archive method uses n (n is an integer no less than 2) archive destination storage means to archive an archive target data, wherein segmentation means for segmenting the archive target data into a plurality of data fragments using a predetermined procedure such that the data fragments cover at least all parts of the archive target data; and, correlating means for correlating each of the plurality of data fragments segmented by the segmentation means to (n−k+1) archive destination storage means independently and randomly; and wherein each of the plurality of data fragments segmented by the segmentation means is archived redundantly in the (n−k+1) archive destination storage means correlated to the each of the plurality of data fragments.

Advantageous Effects of the Invention

According to the present invention, a distributed archive and/or data restoration system which achieves high-speed processing and security, is realized.

DESCRIPTION OF EMBODIMENTS

Hereafter, embodiments of the present invention is described with reference to the attached drawings.
[First Embodiment]
The first embodiment of the present invention is what has the principled design of the invention implemented onto. Here, prior to description of the configuration and operation of the embodiment, the principle of the invention is described.

In an archive system 100 (FIG. 6) according to the first embodiment, for providing the n:k threshold availability and the n:k threshold security, data fragments are sequentially cut out from data to be archived, and each date fragment is redundantly recorded on (n−k+1) storage mediums among m ones. An n:k division key is introduced as information identifying which (n−k+1) storage mediums are selected among n ones. The n:k dividing key is allotted with identifier expressed numerically, and identifies (n−k+1) storage mediums. The data fragment is redundantly stored on (n−k+1) storage mediums independently and randomly identified and selected from the n storage mediums by outputting n:k division keys independently and randomly.

Figure 1:
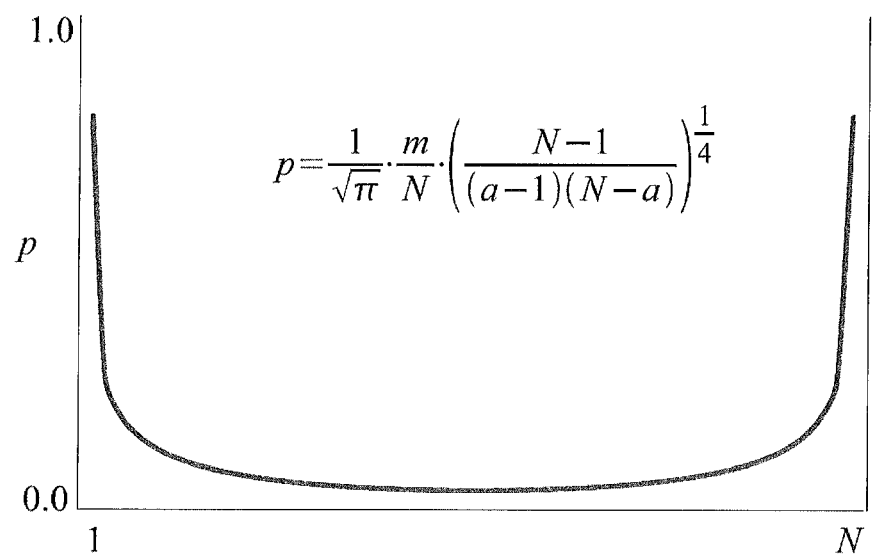
FIG. 1 is a theoretic illustration of the present invention.
Figure 2:
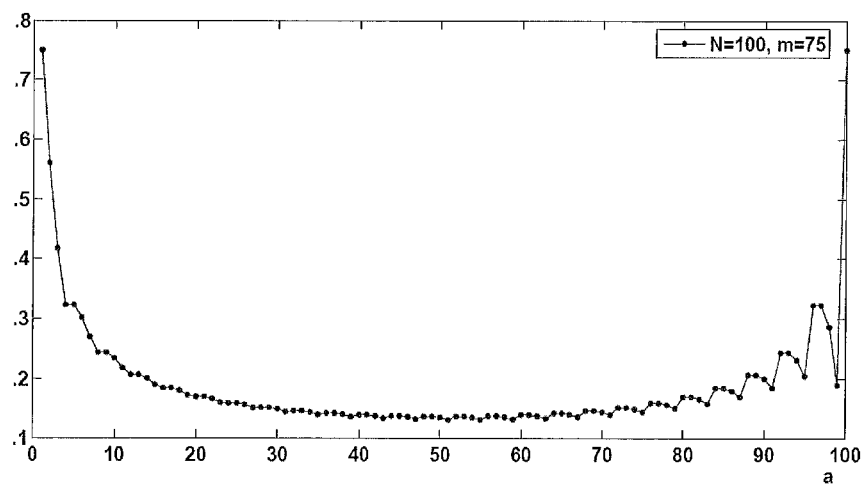
FIG. 2 is an illustration of the simulation result of the principle of the present invention.
Figures 3, 4, 5:
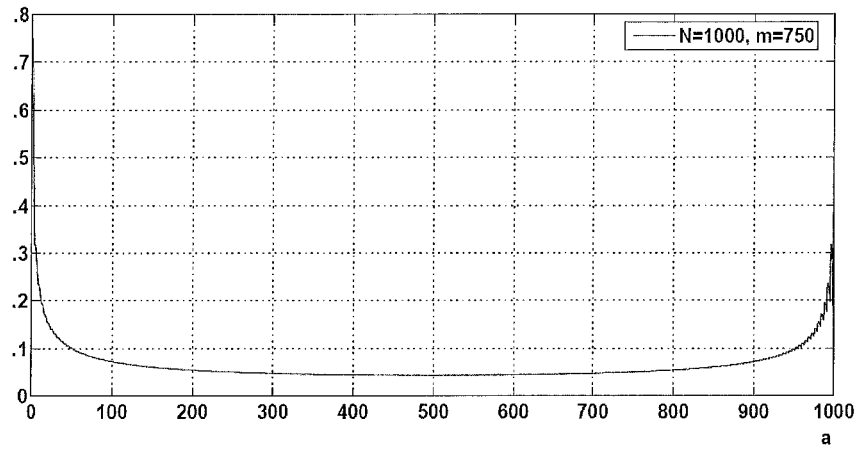
FIG. 3 is an illustration of another simulation result of the principle of the present invention.
FIG. 4 is an illustration of division keys of the first embodiment of the present invention.
FIG. 5 is an illustration of the number of the division keys of the first embodiment.

FIG. 4 shows an example with n=4 and k=2. Since the number of different cases in which (n−k+1) storage mediums are selected from the n storage mediums is $_nC_{(n-k+1)}$, and $_4C_{(4-2+1)}=4$ division keys will exist in this case. Here, consider division keys d_key1, d_key2, d_key3, and d_key4 with identifiers of 1 to 4. The dividing key d_key1 having an identifier of 1 identifies, among the four storage mediums, the first (dst_file1), the second (dst_file2), and the third (dst_file3) mediums, the target data fragment is recorded on the storage mediums dst_file1, dst_file2, and dst_file3. The identifier of an n:k division key is independently and randomly outputted using a random number generator.

FIG. 5 shows the change of the number of n:k division keys when the values of n and k change. Identifiers are prepared for the number of the division keys, and the identifiers are outputted independently and randomly by using a random number generator.

Figure 6:
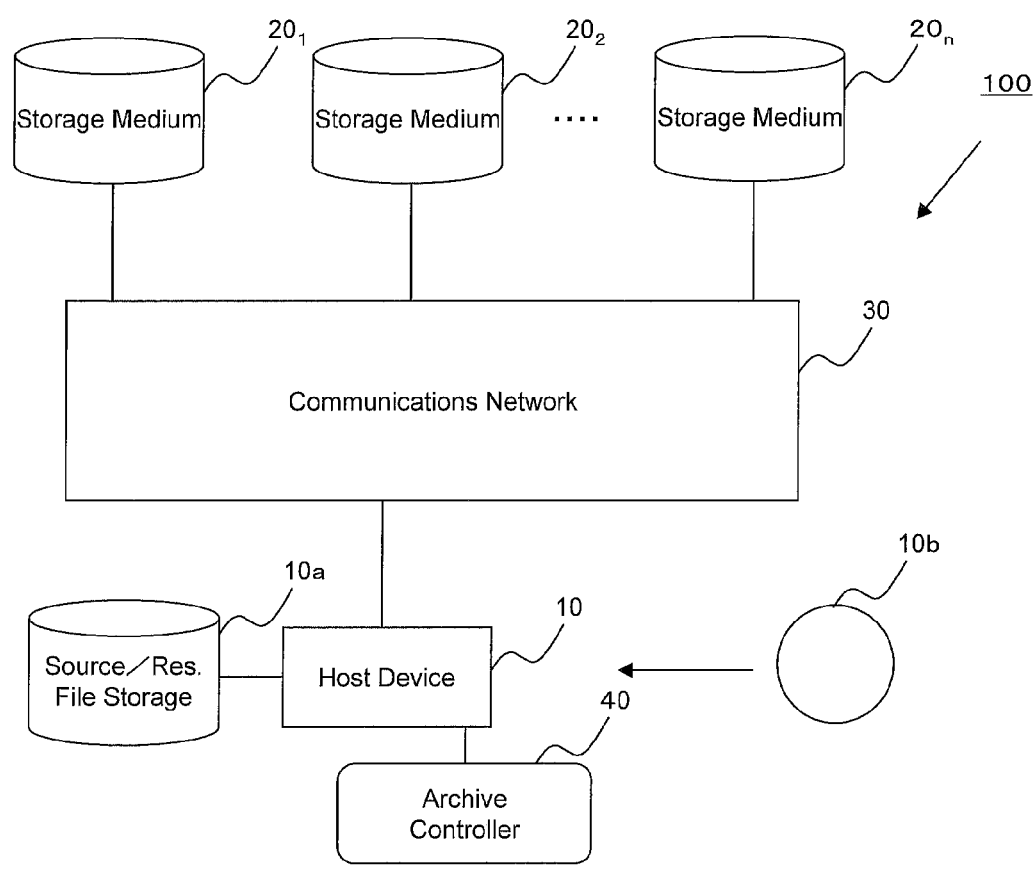
FIG. 6 is an illustration of the entire configuration of the first embodiment.

FIG. 6 shows an archive system 100 according to the first embodiment as a whole, wherein the archive system 100 comprises a host device 10, two or more storage mediums $20_1$ to $20_n$, etc., interconnected by a communications network 30. The host device 10 is an apparatus having information processing functions, such as a personal computer, a cellular phone, a personal digital assistant, and an information home appliance product. The host device 10 has a source/restored file storage unit 10a. The host device 10 can communicate with an information device such as a smart card, a cellular phone, personal digital assistant, as described later, via an interface. The storage mediums $20_1$ to $20_n$ receive and maintain data transmitted with various communications protocols via the communications network 30, and are for example an internal or external storage device of a server computer.

The host device 10 provides an archive controller 40 by for example installing a computer program 10b, which controls the archive and restoration of data. A part of the archive controller 40 may be realized by a smart card etc. The computer program 10b may realize either one of the function for archiving data, and the function for restoring data.

The archive controller 40 of the host device 10, during archive process, takes out data fragments sequentially from a source file (referred to as "data" as well) to be archived, and then redundantly records each data onto (n−k+1) storage mediums identified on the basis of an n: k dividing key which is outputted independently and randomly, among the n storage mediums $20_1$ to $20_n$. Also, the archive controller 40, during restoring process, takes each data fragment from any accessible storage medium among the (n−k+1) storage mediums identified from the n storage mediums 201 to 20n on the basis of the n:k key which was outputted during the archive process, and records each data fragment in an append manner to restore the source file in the end.

Detailed description about the archive and restoration processes of the archive controller 40 is clearly illustrated with a particular configuration described below.

Figure 7:
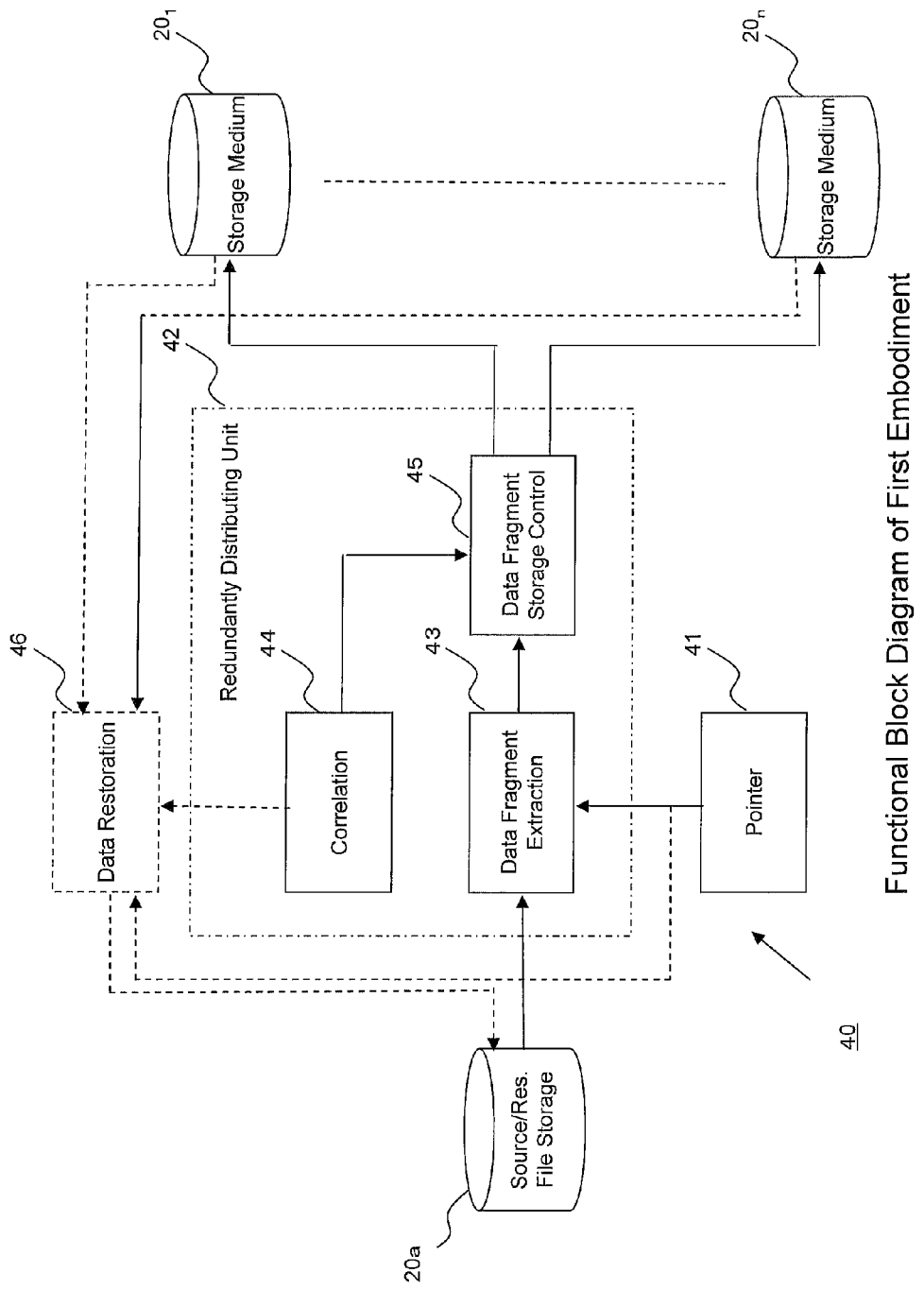
FIG. 7 is an illustration of the functional blocks of the first embodiment.

FIG. 7 shows the configuration of the archive controller 40 realized by the host device 10, wherein the archive controller 40 is constituted including a pointer 41, redundant distribution unit 42, and a data restoration unit 46. The redundant distribution unit 42 is constituted including a data fragment extraction unit 43, a correlation unit 44, and a data fragment storage control unit 45.

The pointer 41 shifts a pointer position from the head to the end of an archive target data (file), and specifies each data fragment. The data fragment extraction unit 43 extracts a data fragment one by one based on the pointer position of the pointer 41. Neighboring data fragments typically adjoin each other so that they do not overlap, although the data fragments may be extracted in such a manner that they overlap in part. The correlation unit 44 functions to relates one extracted data fragment with (n−k+1) storage mediums independently and randomly specified from the n storage mediums $20_1$ to $20_n$, and, typically, outputs the n:k division keys mentioned above. The data fragment storage control unit 45 redundantly records each of the extracted data fragments on the (n−k+1) storage mediums specified independently and randomly from the n storage mediums $20_1$ to $20_n$.

The redundant distribution unit 42 extracts data fragments from the archive target data one by one based on the pointer position of the pointer 41, and records each of the data fragments redundantly on the (n−k+1) storage mediums specified among the n storage medium $20_1$ to $20_n$ dependently and randomly. When all of the data fragments have been redundantly distributed and recorded on the storage mediums $20_1$ to $20_n$, typically, when the pointer position has moved up to the end of the data, the archive operation is completed.

Although the writing of the data fragments on the storage mediums $20_1$ to $20_n$ is directly performed via a communications network and the like here, the data fragments may be recorded in an append manner on recording positions (files), which are provided on the host device 10 or a memory means thereof and correspond to respective storage mediums $20_1$ to $20_n$, and, after the recording of the last data fragment, the files located on the recording positions may be transmitted to the storage mediums $20_1$ to $20_n$ respectively.

The data restoration unit 46 acquires an n:k division key from the correlation unit 44 based on each of the pointer positions of the pointer 41, identifies (n−k+1) storage mediums which store the data fragment corresponding to the pointer position, and extracts a data fragment for each pointer position from any one or more of the identified plural storage mediums to append it to a partially finished file on the source/restored file storage unit 10a. The data restoration unit 46 also manages restoring data fragment positions on the n storage medium $20_1$ to $20_n$.

Figure 8:
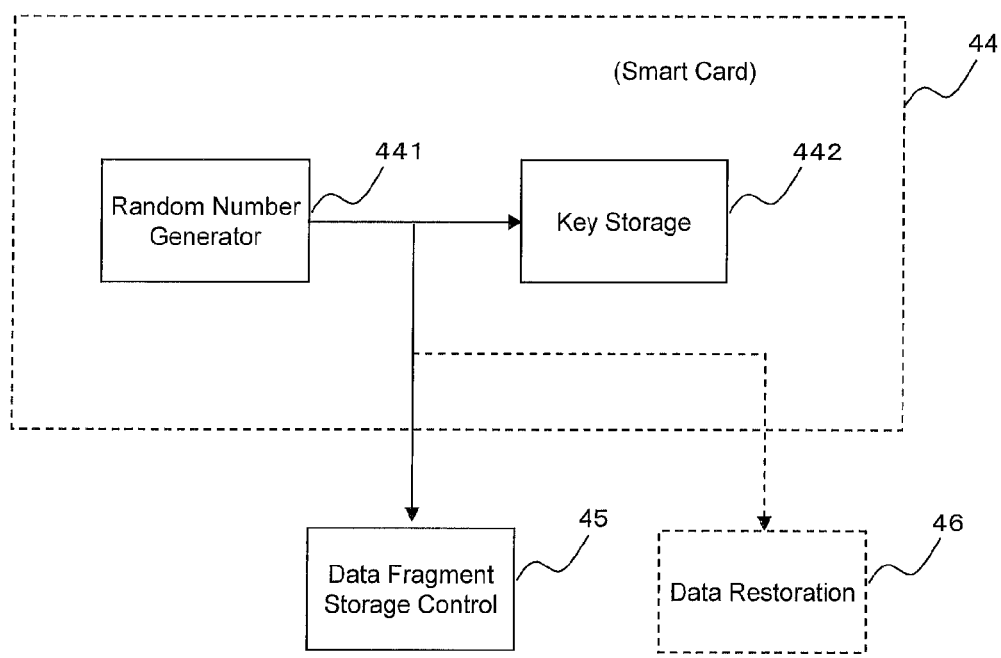
FIG. 8 is an illustration of a configuration example of the correlation unit of the first embodiment.

FIG. 8 shows a configuration example of the correlation unit 44, wherein the correlation unit 44 is constituted including a random number generator 441 and a key storage unit 442. The random number generator 441 outputs the n:k division keys described above, and on the basis of those keys, the data fragment storage control unit 45 of the redundant distribution unit 42 redundantly records each data fragment on the (n−k+1) storage mediums independently and randomly identified among the n storage mediums $20_1$ to $20_n$. The key storage unit 442 maintains the series of n:k division keys outputted from the random number generator 441, and supplies the n:k division keys one by one to the data restoration unit 46 at the time of data restoration. The data restoration unit 46 determines the acquisition places for a data fragment based on the n:k division keys obtained from the key storage unit 442, and performs data restoration.

The correlation unit 44 of FIG. 8 is typically implemented by a portable device such as a smart card (IC card) which a user can carry, a cellular phone, a personal digital assistant (PDA), and the like, but it is not limited to such a device. The portable device realizes a microcomputer and a random number generation means, and those parts are implemented in an IC chip with tamper resistance.

Figure 9:
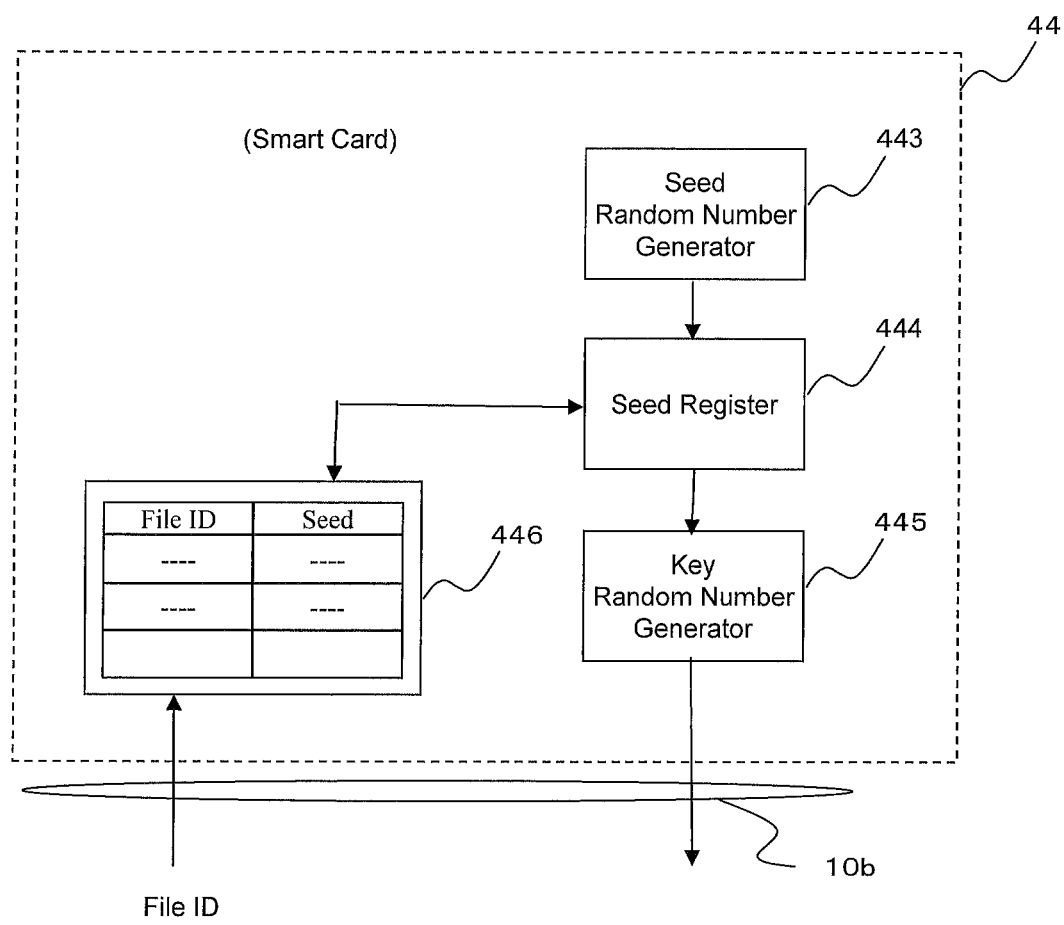
FIG. 9 is an illustration of a more preferable configuration example of the correlation unit of the first embodiment.

FIG. 9 shows a preferable configuration example of the correlation unit 44, wherein the correlation unit 44 is constituted including a seed random number generator 443, a seed register 444, a key random number generator 445, a management table storage unit 446 and the like. The seed random number generator 443 generates a random number using a pseudorandom number generation algorithm and supplies it to the key random number generator 445 as a seed. Each seed is held in the seed register 444, and is managed in the management table storage unit 446 together with a file ID. The key random number generator 445 outputs a series of random numbers based on the seed, and the archive of data is performed based on the series of random numbers. The seed used for the archive is correlated with a file ID of an archive target data, and stored in the management table storage unit 446, and, during data restoration, the seed is taken out form the management table storage unit 446 on the basis of the file ID of the restoration target data, and then the key random number generator 445 outputs the same random number sequence as used at the time of the archive, and is used for data restoration.

The correlation unit 44 of FIG. 9 is also typically implemented by a portable device such as a smart card (IC card) and the like, but it is not limited to such a device.

Next, in relation to the correlation unit 44 of FIG. 9, an operational example of the archive system 100 according to the first embodiment is described. Here, the correlation unit 44 is implemented with a smart card.

Figure 10:
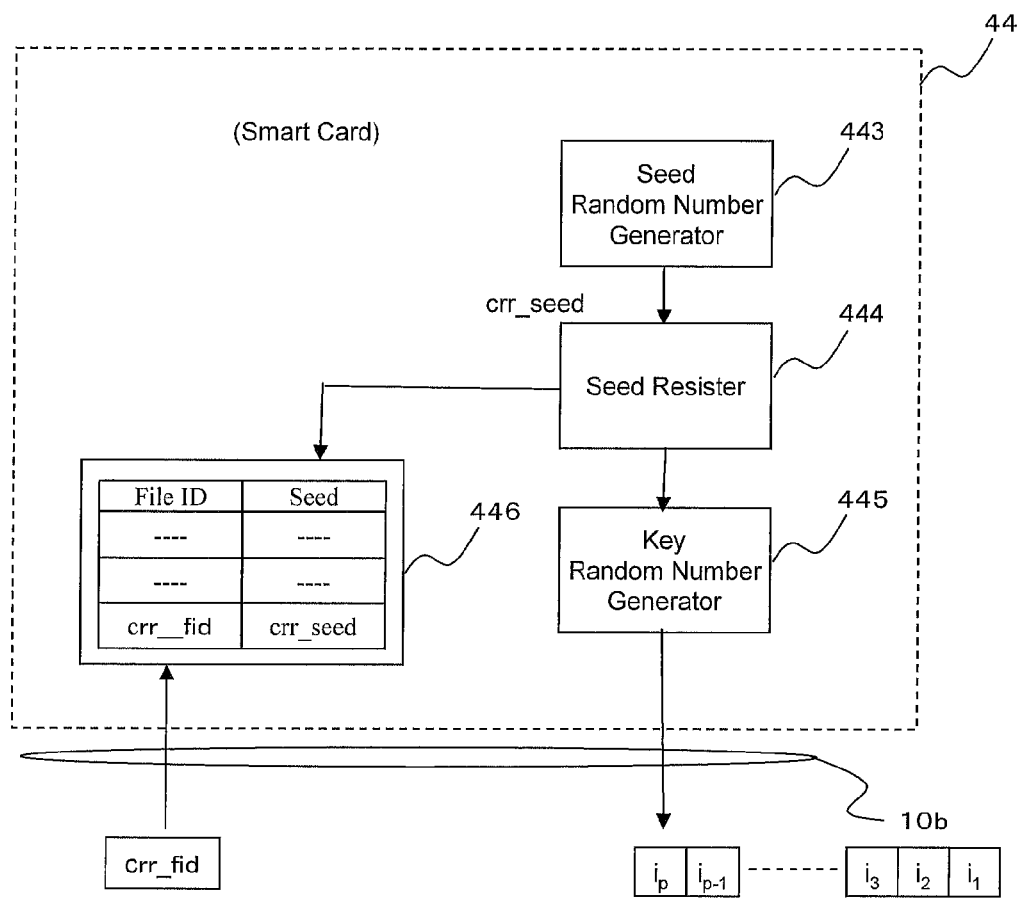
FIG. 10 is an illustration of an example of operation during data archive of the embodiment.

FIG. 10 shows the procedure of a process example of the smart card.

[Step S01]: An identifier crr_fid which specifies a data file to be divided is received from the host device 10.

[Step S02]: The seed random number generator 443 (random number generation program) is called to generate a seed crr_seed for the key random number generator 445 (random number generation program).

[Step S03]: The seed crr_seed is correlated with an identifier crr_fid of a data file and written in the management table storage unit 446 in the smart card.

[Step S04]: The key random number generator 445 is activated with the seed crr_seed received as an input.

[Step S05]: The key random number generator 445 is set in a standby state, and waits for a signal from the host device 10.

[Step S06]: A signal is received from the host device 10. When the signal is instructing the end of processing, the key random number generator 445 is ended, and then the processing is ended. When a signal is a request for a key identifier, the key random number generator 445 is called, and a random number is generated. Since the random number is used as an identifier of an n:k division key, a random number is generated so that it is selected randomly from the natural numbers from 1 to $_nC_{(n-k+1)}$.

[Step S07]: The random number generated by the key random number generator 445 is outputted to the host device 10 as an identifier of an n:k division key.

[Step S08]: The process returns to the step S05 and waits for a signal from the host device 10.

Figure 11:
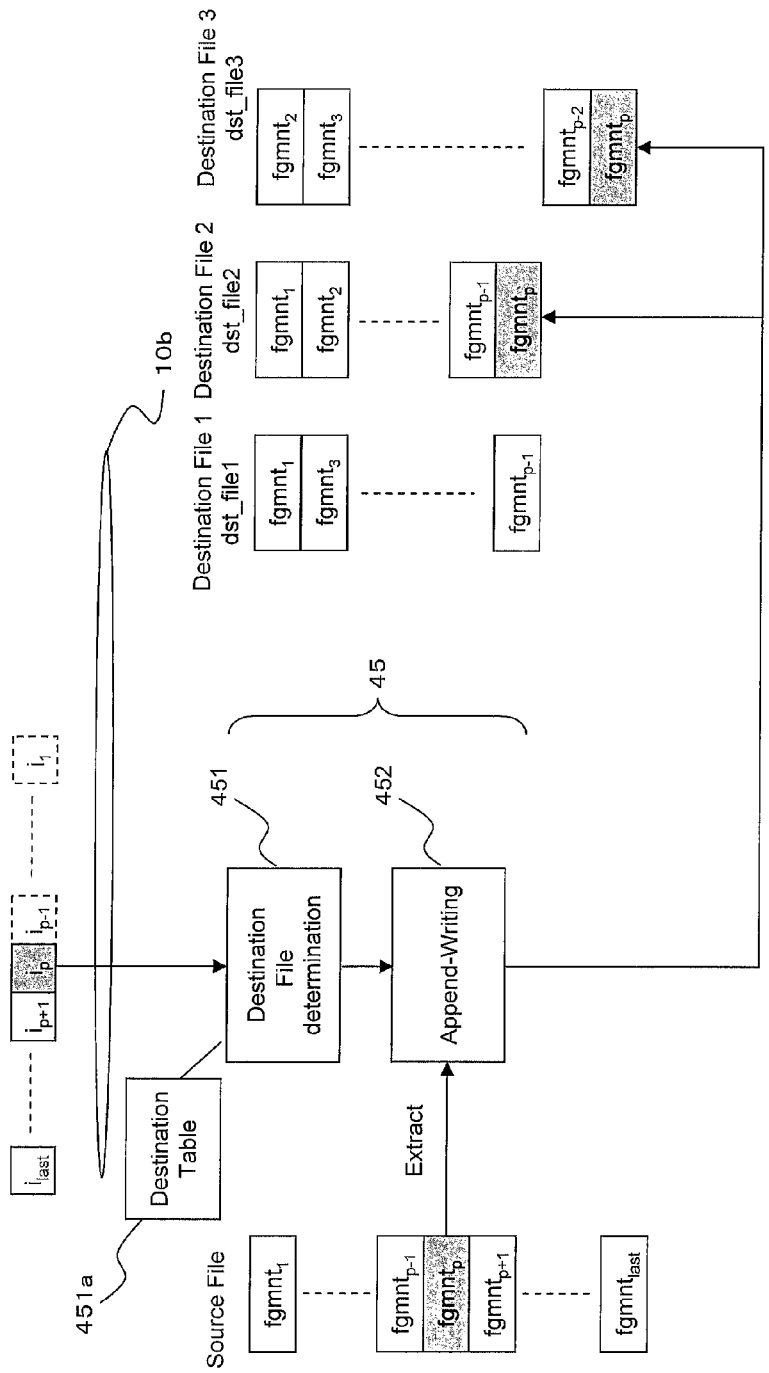
FIG. 11 is an illustration of an example of operation during data restoration of the embodiment.

FIG. 11 describes the procedure of a process example of the archive system on the host device 10. As shown in FIG. 11, the data fragment storage controller 45 of the host device 10 is constituted including for example destination file determination unit 451 and an append-writing unit 452 as corresponding to the correlation unit of FIG. 9. The destination file determination unit 451 obtains for example the table illustrated in FIG. 4 on the basis of the division key randomly outputted, by consulting the destination table storage unit 451a, and specifies (n−k+1) storage mediums(4 units for this example). The append-writing unit 452 appends the data fragment to the (n−k+1) storage mediums. The process is descried in detail below.

[Step S11]: An identifier crr_fid of an archive target data file is sent to the smart card.

[Step S12]: A signal of a request for a key identifier is sent to the smart card.

[Step S13]: The identifier for the n:k division key is received from the smart card, and the storage mediums on which a data fragment is recorded are identified on the basis of the identifier by means of look up operation and the like. As illustrated in the figure, the identifier ip is received and dst_file2 and dst_file3 are specified as the destination storage mediums.

[Step S14]: A data fragment starting from the pointer on the data file (src_file) to be archived and having a certain length is taken out, and the pointer advances to the head of the next data fragment to be taken out.

[Step S15]: A copy of the data fragment as taken out is appended to the end position on the storage mediums as identified (dst_file2 and dst_file3 in FIG. 11).

[Step S16]: When the pointer is pointing the end position of the data file, a signal indicating the end of process is sent to the smart card, or, when data to be archived remains, the process returns to the step S12, and then a request of a key identifier is sent to the smart card.

Figure 12:
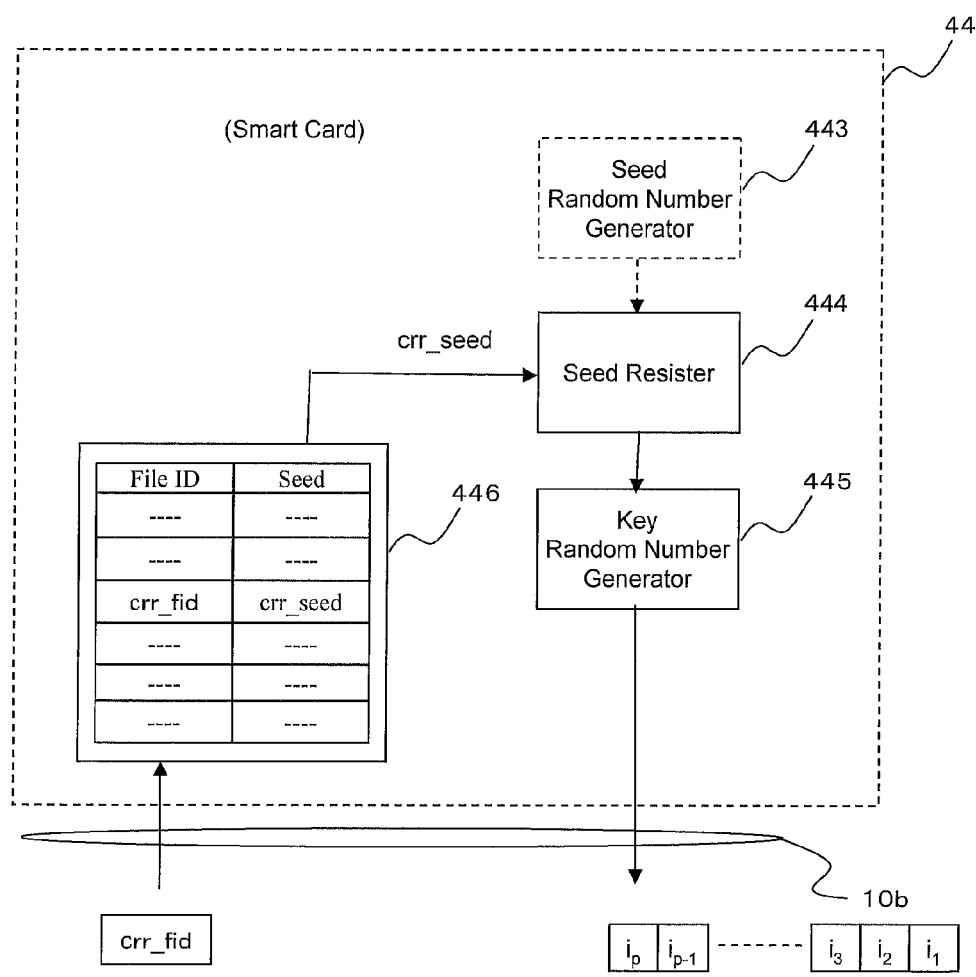
FIG. 12 is an illustration of an example of operation during data restoration of the embodiment.
Figure 13:
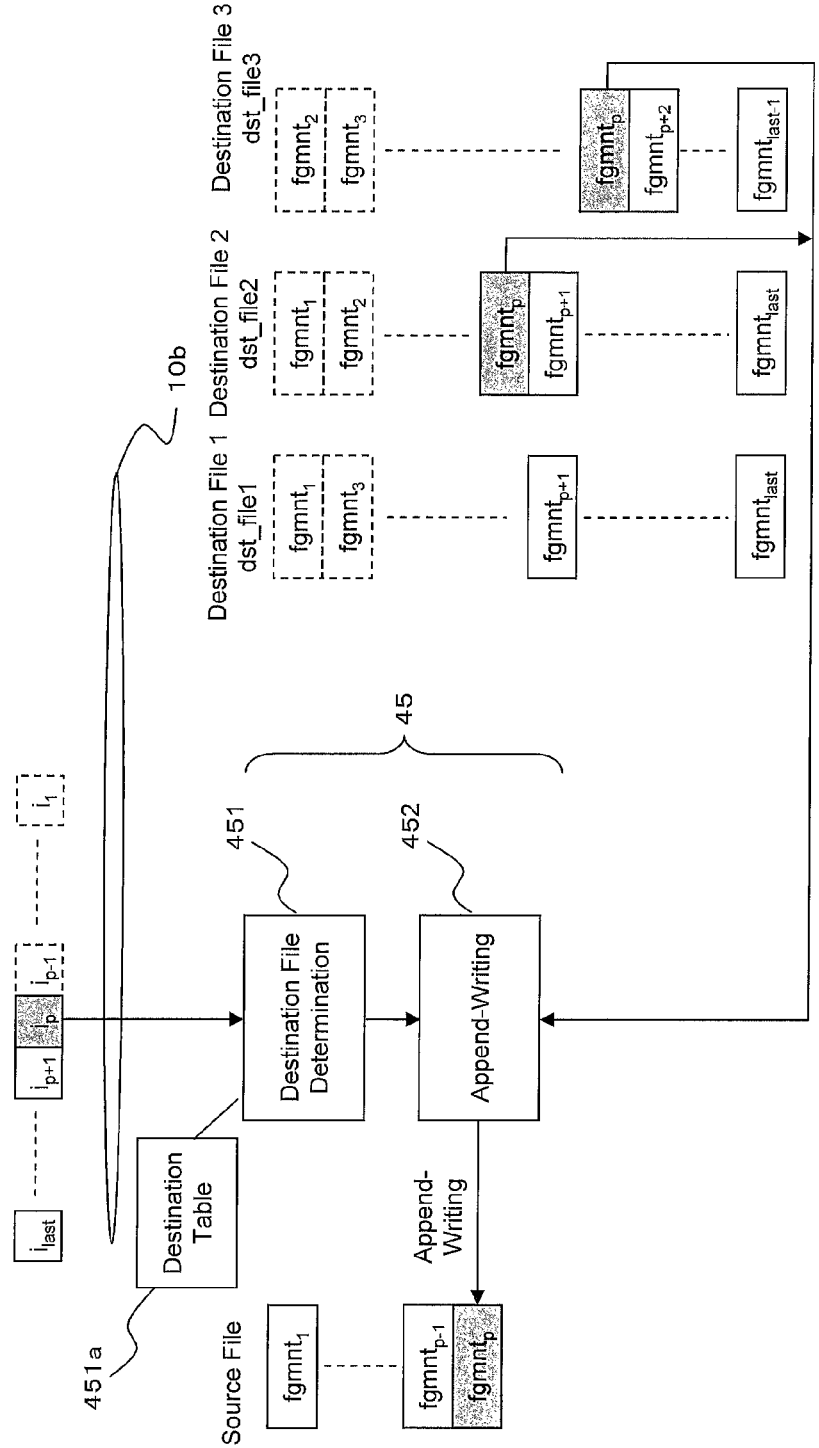

FIG. 12 and FIG. 13 illustrate a data restoration process example.

FIG. 12 shows a procedure of the restoration process performed in the smart card.

[Step S21]: An identifier o crr_fid for a data file is received from the host device 10.

[Step S22]: The table in the management table storage unit 446 is consulted and the seed crr_seed which is correlated to the identifier crr_fid is obtained.

[Step S23]: The key random number generator 445 is activated with the input of the seed crr_seed.

[Step S24]: The key random number generator 445 is placed in a standby state, and waits for a signal from the host device 10.

[Step S25]: A signal is received from the host device 10. When the signal is instructing the end of processing, the key random number generator 445 is ended, and then the processing is ended. When a signal is a request for a key identifier, the key random number generator 445 is called, and a random number is generated. Since the random number is used as an identifier of an n: k division key, a random number is generated so that it is selected randomly from the natural numbers from 1 to $_nC_{(n-k+1)}$.

[Step S26]: The random number generated by the key random number generator 445 is outputted to the host device 10 as an identifier of an n:k division key.

[Step S27]: The process returns to the step S22 and waits for a signal from the host device 10.

FIG. 13 shows the procedure of an archive process example on the host device 10.

[Step S31]: An identifier crr_fid of a restoration target data file is sent to the smart card.

[Step S32]: A signal of a request for a key identifier is sent to the smart card.

[Step S33] The identifier for the n:k division key is received from the smart card, and the storage mediums from which a data fragment is obtained are identified on the basis of the identifier by means of lookup and the like. As illustrated in the figure, the identifier ip is received and dst_file2 and dst_file3 are specified as the storage mediums.

[Step S34]: The heading data fragment is removed every identified storage mediums (dst_file2 and dst_file3 for the case illustrated in FIG. 9). The leading end of each storage medium after the removal of the data fragment can be managed as a check point.

[Step S35]: A copy of the data fragment as taken out in the step 34 is appended to the end position of the data file (src_file) on the way of restoration.

[Step S36]: when no data remains on every storage mediums, a signal indicating the end of process is sent to the smart card, or, when data for restoration remains, the process returns to the step S32, and then a request of a key identifier is sent to the smart card.

The description of the first embodiment is ended above.

[Second Embodiment]

Next, an archive system according to the second embodiment of the present invention is descried. In the second embodiment, the length of the data fragment is determined randomly each time in order to enhance the security.

In contrast from the first embodiment, the output from the key random number generator 445 determines the length of a data fragment in addition to the identifier of the division key. In particular, the output of the key random number generator 445 is composed of a pair of one natural number ip for setting the division key and another natural number setting the length of the data fragment.

Figure 14:
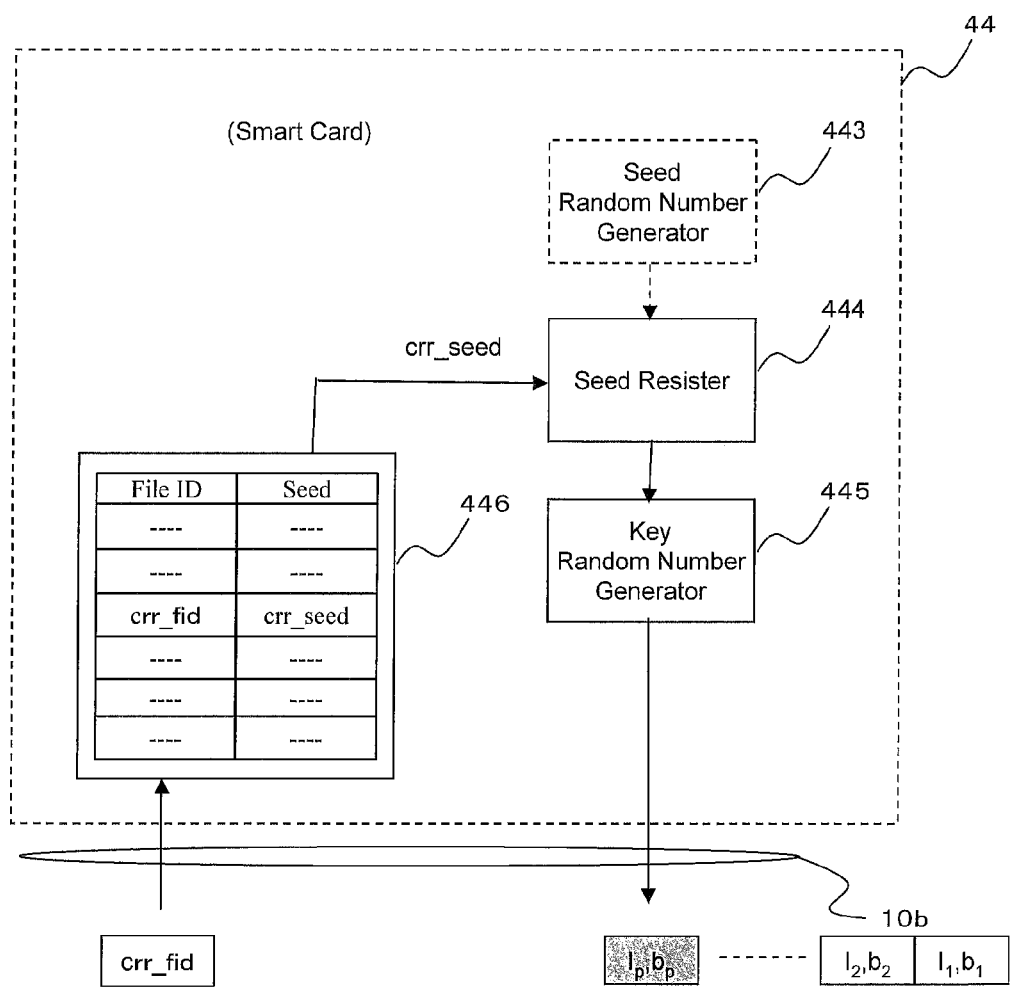
FIG. 14 is an illustration of the second embodiment of the present invention.
Figure 15:
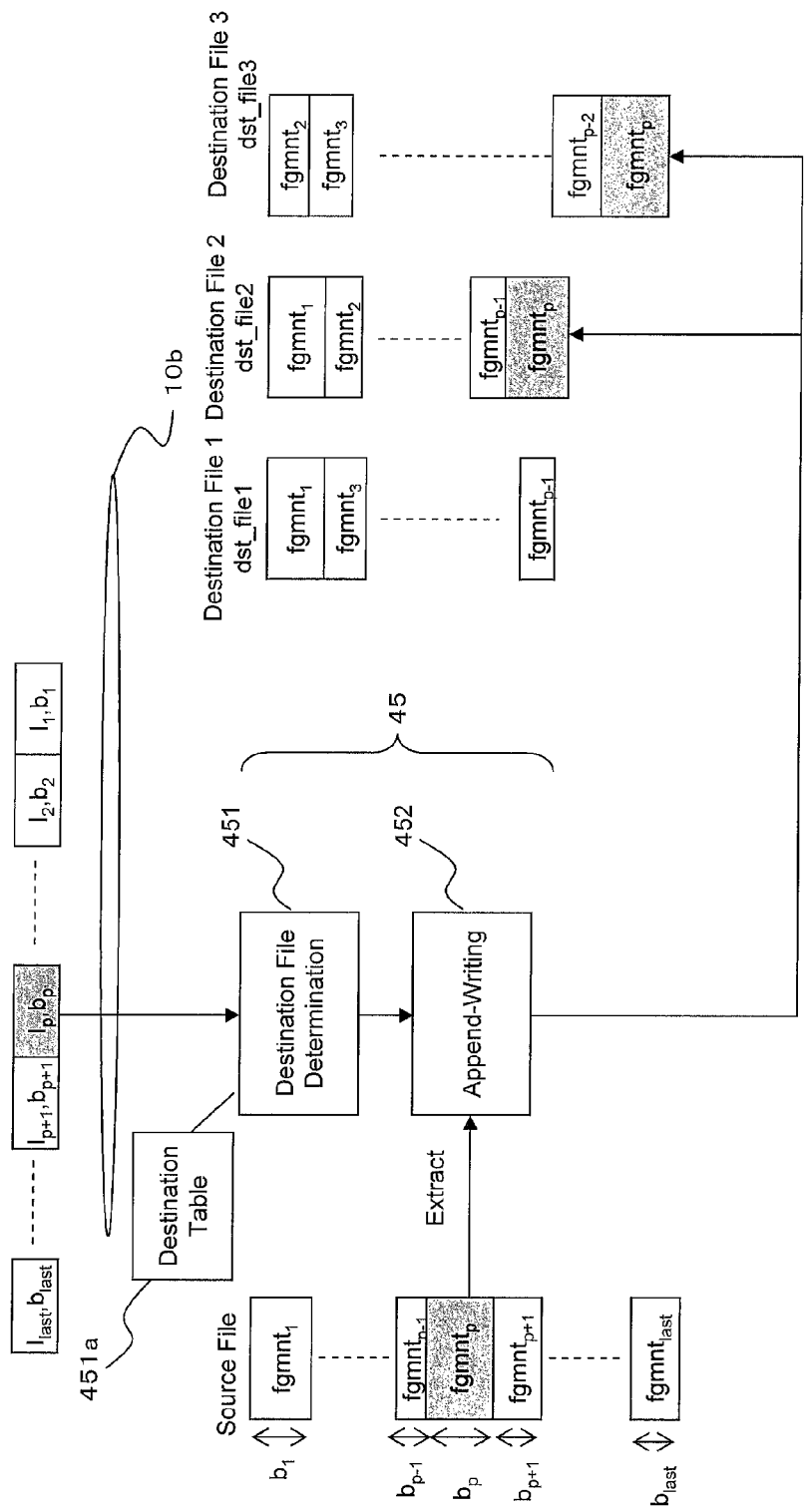
FIG. 15 is an illustration of the second embodiment of the present invention.

FIG. 14 and FIG. 15 illustrate process examples of the archive system on the smart card and host device 10 respectively.

FIG. 14 shows the procedure of a process example on the smart card.

[Step S41]: An identifier crr_fid which specifies a data file to be divided is received from the host device 10.

[Step S42]: The seed random number generator 443 is called to generate a seed crr_seed for the key random number generator 445.

[Step S43]: The seed crr_seed is correlated with an identifier crr_fid of a data file and written in the management table storage unit 446 in the smart card.

[Step S44]: The key random number generator 445 is activated with the seed crr_seed received as an input.

[Step S45]: The key random number generator 445 is set in a standby state, and waits for a signal from the host device 10.

[Step S46]: A signal is received from the host device 10. When the signal is instructing the end of processing, the key random number generator 445 is ended, and then the processing is ended. When a signal is a request for a key identifier, the key random number generator 445 is called, and a random number is generated. Since the random number is used as indicating an identifier ip of an n:k division key, and the length (bit length) by of a data fragment, the random number is a pair randomly generated and composed of one natural number selected from 1 to $_nC_{(n-k+1)}$, and another natural number indicating the length. Two pseudorandom number generation means may be used to generate ip and by individually.

[Step S47]: The random number generated by the key random number generator 445 is outputted to the host device 10 as indicating an identifier of an n:k division key and the length of the data fragment.

[Step S48]: The process returns to the step S45 and waits for a signal from the host device 10.

FIG. 15 describes the procedure of a process example of the archive system on the host device 10.

[Step S51]: An identifier crr_fid which specifies a data file to be divided is received by the smart card from the host device 10.

[Step S52]: A signal of a request for a key identifier is sent to the smart card.

[Step S53] The identifier for the n:k division key is received from the smart card, and the storage mediums on which a data fragment is recorded are identified on the basis of the identifier by means of look up and the like. As illustrated in the figure, the identifier ip and the length by of the data fragment are received and dst_file2 and dst_file3 are specified by the ip value as the destination storage mediums.

[Step S54]: The data fragment (fgmntp) starting from the pointer on the data file (src_file) to be archived and having a length equal to the by as set is taken out, and the pointer advances to the head of the next data fragment to be taken out.

[Step S55]: A copy of the data fragment as taken out is appended to the end position on the identified storage mediums dst_file2 and dst_file3.

[Step S56]: When the pointer is pointing the end position of the data file, a signal indicating the end of process is sent to the smart card, or, when data to be archived remains, the process returns to the step S52, and then a request of a key identifier is sent to the smart card.

The procedure of restoration of the original data file is performed in the reverse order of the above-mentioned archive procedure, and since it can be anticipate easily from the description of the first embodiment as well, the description thereof is omitted. The description of the second embodiment is ended above.

[Third Embodiment]

Next, the third embodiment of the present invention is described. In the third embodiment, dummy data units are archived at random timing to enhance the security.

In contrast form the first embodiment, the output from the key random number generator 445 determines whether or not a dummy data is inserted or not, in addition to the identifier of the division key. In particular, the output of the key random number generator 445 is composed of a pair of a natural number ip for setting the division key and a logical value rp setting the insertion of a dummy data. The logical value is a true or a false, and the probability distribution is not necessarily uniform (the probability that a truth (or a false) will be outputted is not necessarily ½).

Figure 16:
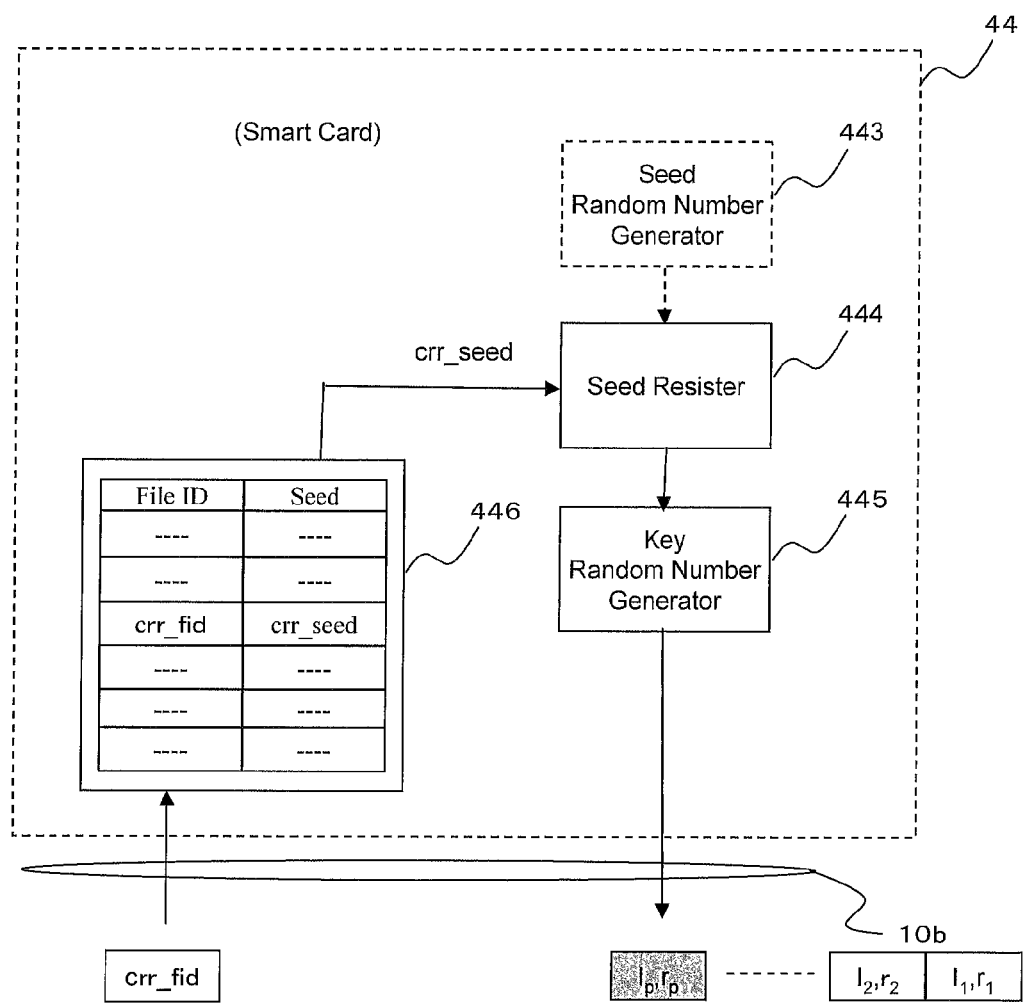
FIG. 16 is an illustration of the third embodiment of the present invention.

FIG. 16 shows the procedure of a process example on the smart card.

[Step S61]: An identifier crr_fid which specifies a data file to be divided is received by the smart card from the host device 10.

[Step S62]: The seed random number generator 443 is called to generate a seed crr_seed for the key random number generator 445.

[Step S63]: The seed crr_seed is correlated with an identifier err fid of a data file and written in the management table storage unit 446 in the smart card.

[Step S64]: The key random number generator 445 is activated with the seed crr_seed received as an input.

[Step S65]: The key random number generator 445 is set in a standby state, and waits for a signal from the host device 10.

[Step S66]: A signal is received from the host device 10. When the signal is instructing the end of processing, the key random number generator 445 is ended, and then the processing is ended. When a signal is a request for a key identifier, the key random number generator 445 is called, and a random number is generated. The random number is a pair of a natural number ip for setting the division key and a logical value rp setting the insertion of a dummy data.

[Step S67]: The random number generated by the key random number generator 445 is outputted to the host device 10 as an identifier of an n:k division key and the length of the data fragment.

[Step S68]: The process returns to the step S65 and waits for a signal from the host device 10.

FIG. 11 describes the procedure of a process example of the archive program on the host device 10. Here, the procedure is described with numbers.

[Step S71]: An identifier crr_fid of an archive target data file is sent to the smart card.

[Step S72]: A signal of a request for a key identifier is sent to the smart card.

[Step S73]: The identifier for the n:k division key and the logical value setting the insertion of the dummy data are received from the smart card, and the storage mediums on which a data fragment is recorded are identified on the basis of the identifier by means of look up and the like. As illustrated in the figure, the identifier ip and the logical value rp are received and dst_file2 and dst_file3 are specified by the ip value as the destination storage mediums.

[Step S74]: When the value of rp is true, dummy data is generated randomly.

[Step S75]: When the value of rp is false, a data fragment starting from the pointer on the data file (src_file) to be archived and having a certain length is taken out, and the pointer advances to the head of the next data fragment to be taken out.

Figure 17:
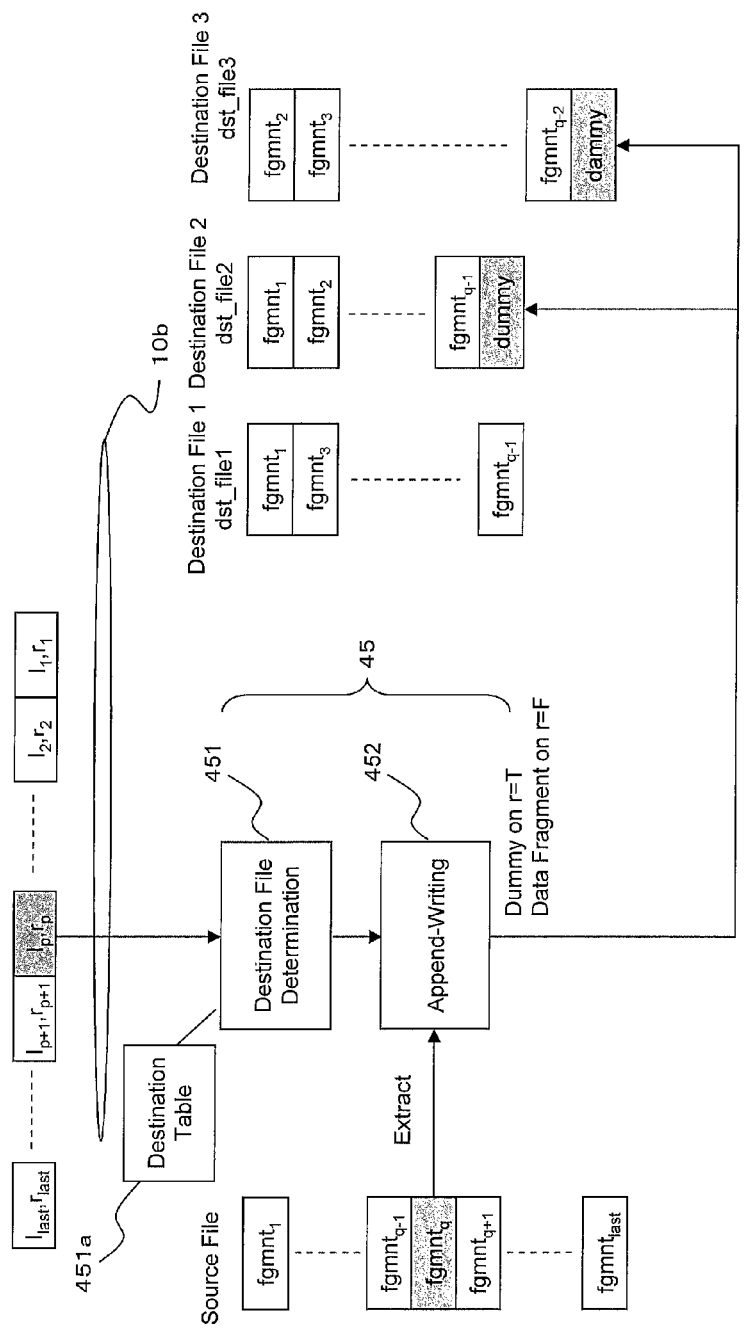
FIG. 17 is an illustration of the third embodiment of the present invention.

[Step S76]: Depending on the value of rp, the copy of the generated dummy data or the obtained data fragment is appended to the end position on the storage mediums as identified (dst_file2 and dst_file3 in FIG. 17).

[Step S77]: When the pointer is pointing the end position of the data file, a signal indicating the end of process is sent to the smart card, or, when data to be archived remains, the process returns to the step S72, and then a request of a key identifier is sent to the smart card.

The procedure of restoration of the archive system on the smart card and the host can be anticipated easily from the description of the first embodiment as well, the description thereof is omitted. The description of the embodiments of the present invention is ended above.

The present invention is not limited to above mentioned embodiments, and is susceptible to various modifications. Also, the embodiments can be combined with each other. For example, the length of a data fragment can be variable as in the second embodiment, while the switch between a dummy data and data fragment can be performed. It is only required to predetermine the manner in which data fragments are cut out, and it is not limited to one in which they are cut out in the order from the head to the tail of the data. As long as a set of final data fragments covers all parts of the data, any manner can be used. Data fragments may overlap in part. Dummy data may be added to the head and end of data to be archived. An archive target data can be redundantly recorded on plural portable mediums, and then those storage mediums can be transported to different remotes sites.

The present invention can be applied to an apparatus or a system for only data archive, or an apparatus or a system for only restoration.

EXPLANATION OF NUMERICAL REFERENCES 10 host device
10a source/restored file storage unit
10b computer program
$20_1$ to $20_n$ storage medium
30 communications network
40 archive controller
41 pointer
42 redundant distribution unit
43 data fragment extraction unit
44 correlation unit
45 data fragment storage control unit
46 data restoration unit
100 archive system
441 random number generator
442 key storage unit
443 seed random number generator
444 seed register
445 key random number generator
446 management table storage unit

The invention claimed is:

1. A distributed archive system for distributing and storing archive target data on n storage devices, where, n is an integer no less than 2, comprising:
the n storage devices connected to a communications network; and,
a host device communicating with the n storage devices through the communications network,
wherein, the host device is configured to:
store table data correlating distributing identifiers to storage device groups, where each of the storage device groups includes (n−k+1) storage devices, and k is an integer no more than n;
move a pointer over pointer positions along the archive target data in a sequential order, from a leading position of the archive target data toward a trailing position of the archive target data;
extract a data fragment from the archive target data at each of the pointer positions,
receive a random number generated for the each of the pointer positions to serve as a distributing identifier;
look up the table data with the distributing identifier to determine a storage device group corresponding to the distributing identifier; and
append the data fragment to a destination file on each of the (n−k+1) storage devices included in the storage device group determined by the distribution identifier for each of the pointer positions.

2. The distributed archive system of claim 1, wherein, a length of an extracted data fragment is determined independently and randomly for the each of the pointer positions.

3. The distributed archive system of claim 1, a part or all of the n storage devices are server computers accessible over the communications network.

4. The distributed archive system of claim 1, wherein dummy data units are added to leading and tailing ends of the archive target data.

5. A distributed archive system for distributing and storing archive target data on n storage devices, where, n is an integer no less than 2, comprising:
the n storage devices connected to a communications network; and
a host device communicating with the n storage devices through the communications network,
wherein, the host device is configured to:
store table data correlating distributing identifiers to storage device groups, where each of the storage device groups includes (n−k+1)storage devices, and k is an integer no more than n;
prepare n destination files, the n destination files corresponding to the n storage devices respectively;
move a pointer over pointer positions along the archive target data in a sequential order, from a leading position of the archive target data toward a trailing position of the archive target data;
extract a data fragment from the archive target data at each of the pointer positions,
receive a random number generated for the each of the pointer positions to serve as a distributing identifier;
look up the table data with the distributing identifier to determine a storage device group corresponding to the distributing identifier; and
append the data fragment to the (n−k+1) destination files included in the storage device group determined by the distribution identifier for each of the pointer positions; and
send the n destination files to the n storage devices corresponding to the n destination files respectively after a last data fragment is appended to identified (n−k+1) destination files.

* * * * *